US012803919B2

(12) United States Patent
Pazhyannur et al.

(10) Patent No.: US 12,803,919 B2
(45) Date of Patent: Nov. 17, 2026

(54) UNIVERSAL GATEWAY FOR POLICY-AWARE TRAFFIC FORWARDING FOR MULTIPLE TYPES OF NETWORK TRAFFIC

(71) Applicant: Atayalan, Inc., Santa Clara, CA (US)

(72) Inventors: Rajesh Pazhyannur, Fremont, CA (US); Chih Hsin Lin, New Taipei (TW); Yan Wei Chen, Tainan (TW); Li Fung Chang, Holmdel, NJ (US)

(73) Assignee: ATAYALAN, INC., Santa Clara, CA (US)

(*) Notice: Subject to any disclaimer, the term of this patent is extended or adjusted under 35 U.S.C. 154(b) by 647 days.

(21) Appl. No.: 18/203,063

(22) Filed: May 30, 2023

(65) Prior Publication Data

US 2023/0396557 A1 Dec. 7, 2023

Related U.S. Application Data

(60) Provisional application No. 63/347,993, filed on Jun. 1, 2022.

(51) Int. Cl.
*H04L 47/2441* (2022.01)
*H04L 9/40* (2022.01)

(52) U.S. Cl.
CPC ...... *H04L 47/2441* (2013.01); *H04L 63/0281* (2013.01); *H04L 63/0892* (2013.01)

(58) Field of Classification Search
None
See application file for complete search history.

(56) References Cited

U.S. PATENT DOCUMENTS

| | | | | |
|---|---|---|---|---|
| 7,742,428 | B1 * | 6/2010 | Schlesener | H04L 12/66 370/252 |
| 10,098,028 | B2 * | 10/2018 | Horn | H04W 88/10 |
| 2008/0130576 | A1 * | 6/2008 | Jun | H04W 76/15 370/329 |
| 2018/0262924 | A1 * | 9/2018 | Dao | H04W 72/535 |
| 2019/0053105 | A1 * | 2/2019 | Park | H04L 41/08 |
| 2019/0394745 | A1 * | 12/2019 | Yu | H04W 60/00 |
| 2020/0022076 | A1 * | 1/2020 | Yao | H04L 12/1407 |
| 2020/0187301 | A1 * | 6/2020 | Park | H04W 60/005 |
| 2020/0205208 | A1 * | 6/2020 | Hu | H04W 76/11 |
| 2021/0136676 | A1 * | 5/2021 | Muller | H04W 48/18 |
| 2021/0321292 | A1 * | 10/2021 | Dudda | H04W 28/0268 |

(Continued)

*Primary Examiner* — Otis L Thompson, Jr.
(74) *Attorney, Agent, or Firm* — SU IP CONSULTING

(57) ABSTRACT

Example methods and systems for policy-aware traffic forwarding for multiple types of network traffic are described. In one example, a computer system may extract identification information associated with a first client, wherein the first client is associated with a first type of network traffic and obtain a first policy associated with the first client. In response to detecting first network traffic of the first type from the first client, the computer system may (a) interwork the first network traffic into a data plane entity associated with the second type of network traffic, and (b) forward the first network traffic via the data plane entity according to the first policy. In response to detecting second network traffic of the second type from a second client, the computer system may forward the second network traffic via the data plane entity according to a second policy associated with the second client.

21 Claims, 10 Drawing Sheets

(56) References Cited

U.S. PATENT DOCUMENTS

| | | | | |
|---|---|---|---|---|
| 2021/0321403 | A1* | 10/2021 | Ye | H04L 5/0044 |
| 2021/0368411 | A1* | 11/2021 | Jin | H04W 36/08 |
| 2022/0053416 | A1* | 2/2022 | Salkintzis | H04W 48/18 |
| 2022/0086236 | A1* | 3/2022 | Zhang | H04L 67/146 |
| 2022/0141134 | A1* | 5/2022 | Lin | H04L 45/745<br>370/328 |
| 2022/0150166 | A1* | 5/2022 | Yang | H04L 12/4633 |
| 2022/0360948 | A1* | 11/2022 | Moon | H04L 41/0894 |
| 2022/0393984 | A1* | 12/2022 | Puente Pestaña | H04L 47/2441 |
| 2023/0292172 | A1* | 9/2023 | Puente Pestaña | H04W 60/00 |

* cited by examiner

900

*Routing table for POD1* 940

| IP Address | GW | Mask | Flags | Interface |
|---|---|---|---|---|
| 0.0.0.0 | 10.1.1.2 | 0.0.0.0 | UG | veth0 |
| 10.1.1.0 | 0.0.0.0 | 255.255.255.0 | U | veth0 |
| 10.1.1.2 | 0.0.0.0 | 255.255.255.255 | UM | veth0 |
| 192.168.10.0 | 0.0.0.0 | 255.255.255.0 | U | eth0 |

*Routing table for POD2* 950

| IP Address | GW | Mask | Flags | Interface |
|---|---|---|---|---|
| 0.0.0.0 | 192.168.200.254 | 0.0.0.0 | UG | eth0 |
| 10.1.1.0 | 0.0.0.0 | 255.255.255.0 | U | veth0 |
| 10.1.1.1 | 0.0.0.0 | 255.255.255.255 | UM | veth0 |
| 192.168.200.254 | 0.0.0.0 | 255.255.255.255 | UM | eth0 |
| 192.168.10.0 | 10.1.1.1 | 255.255.255.0 | UG | veth0 |

*Routing table for POD1 1040*

| IP Address | GW | Mask | Flags | Interface |
|---|---|---|---|---|
| 0.0.0.0 | 10.1.1.2 | 0.0.0.0 | UG | veth0 |
| IP-AAA | 192.168.200.254 | 255.255.255.255 | UG | eth1 |
| 192.168.200.2 | 0.0.0.0 | 255.255.255.255 | UM | eth1 |
| 192.168.200.2 | 0.0.0.0 | 255.255.255.0 | U | eth1 |
| 10.1.1.0 | 0.0.0.0 | 255.255.255.0 | U | veth0 |
| 10.1.1.2 | 0.0.0.0 | 255.255.255.255 | UM | veth0 |
| 192.168.10.0 | 0.0.0.0 | 255.255.255.0 | U | eth0 |

UNIVERSAL GATEWAY FOR POLICY-AWARE TRAFFIC FORWARDING FOR MULTIPLE TYPES OF NETWORK TRAFFIC

CROSS-REFERENCE TO RELATED APPLICATION

The present application claims priority to, and the benefits of, U.S. Provisional Application No. 63/347,993 filed on Jun. 1, 2022, the content of which is incorporated herein by reference.

BACKGROUND

Most enterprise deployments contain a mix of 5G, Wi-Fi and wired/Ethernet devices. Conventionally, each device's security and traffic forwarding policy are handled separately. There are usually separate gateways for Wi-Fi and 5G. In some cases, administrators generally have to provision the Wi-Fi and 5G policy separately and use separate dashboards to monitor the Wi-Fi and 5G clients. This is duplication of effort and in many cases may lead to inconsistent policy due to human error. For example, an administrator may update a policy for Wi-Fi clients but overlook the 5G policy provisioning. Besides provisioning, policy enforcement may be handled in separate gateways, which may lead to increased complexity and inconsistency.

DETAILED DESCRIPTION

Figure 1:
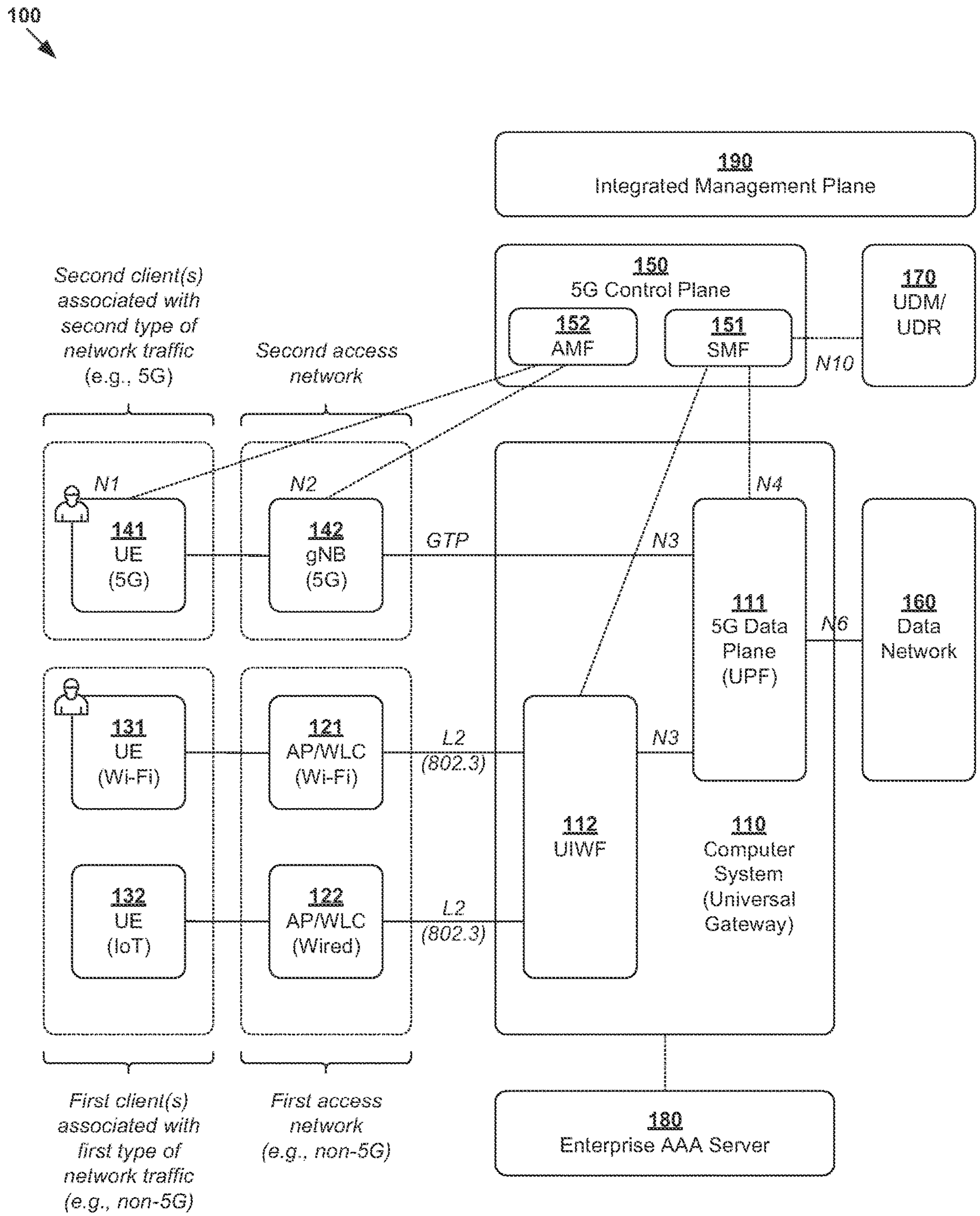
FIG. 1 is a schematic diagram illustrating an example network environment in which a computer system may perform policy-aware traffic forwarding for multiple types of network traffic.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Universal Gateway

According to examples of the present disclosure, a computer system capable of acting as a universal gateway may be deployed to perform policy-aware traffic forwarding for multiple types of network traffic, such as 5G, Wi-Fi and wired/Ethernet traffic. Some examples will be discussed using FIG. 1, which is a schematic diagram illustrating example network environment 100 in which computer system 110 may perform policy-aware traffic forwarding for multiple types of network traffic. It should be understood that, depending on the desired implementation, network environment 100 may include additional and/or alternative components than that shown in FIG. 1.

Throughout the present disclosure, various examples will be discussed using fifth generation (5G) mobile communications system technology shown in FIG. 1. Example implementation details relating to 5G are described in various technical specifications (TSs) published by the Third Generation Partnership Project (3GPP). Example specifications (referred as "the 3GPP standards") include 3GPP TS 23.501 entitled "System architecture for the 5G system" and TS 23.502 entitled "Procedures for the 5G system," the content of which is incorporated herein by reference. Although described using 5G, examples of the present disclosure may be implemented using any suitable future-generation mobile communications system(s).

In the example in FIG. 1, a computer system capable of acting as universal gateway 110 (also known as the Atayalan Universal Gateway) may be deployed in network environment 100 to provide a single point of control of multiple types of network traffic. In the following, the term "first type of network traffic" (e.g., non-5G traffic) may refer generally to traffic associated with non-5G-capable "first client" 131/132 that are connected to non-5G access network 121/122, such as wireless local area network (WLAN) or Wi-Fi traffic, wired/Ethernet traffic, etc. Wi-Fi is a family of wireless networking protocols based on the IEEE 802.11 family of standards.

The term "second type of network traffic" (e.g., 5G traffic) may refer generally to traffic associated with 5G-capable "second client" 141 that is able to connect to radio access network 142 associated with a mobile communications system, which is known as a gNodeB (gNB) in 5G systems. According to the 3GPP standards, non-5G access network 121/122 may be referred to as non-3GPP access network, and 5G radio access network 142 as 3GPP access network. Each client 131/132/141 may represent a user equipment (UE), such as mobile phone, tablet/laptop computer, Internet of Things (IoT) device, etc. Although the terms "first" and "second" are used to describe various elements throughout the present disclosure, these elements should not be limited by these terms. These terms are used to distinguish one element from another. For example, a first element may be referred to as a second element, and vice versa.

Universal gateway 110 may be configured to enforce a uniform security and traffic management policy across the multiple types of network traffic, such as based on admin specifications. Referring to FIG. 1, universal gateway 110 may include (a) user plane function (UPF) 111 and (b) universal interworking function (UIWF) 112. UPF 111 is a 5G data plane entity to serve as a universal policy execution point (PEP) and provide access to data network 160 (e.g., the Internet). UIWF 112 may be configured to interwork all non-5G traffic from first client 131/132 into UPF 111. On the data plane, UIWF 112 may sit between UPF 111 and non-5G access network infrastructure 121/122, such as access point (AP) or wireless local area network (LAN) controller (denoted as "AP/WLC") to which first client 131/132 is connected.

Depending on the desired implementation, UIWF 112 and AP/WLC 121/122 may be configured to reside on the same layer-2 network. For example, UIWF 112 may include a router (to be discussed using FIGS. 9-10) that behaves as a default router for a subnet associated with first client 131/132. UIWF 112 may further include an N3 gateway (to be discussed using FIGS. 9-10) to connect with UPF 111 via an N3 interface, thereby interworking the first type of network traffic from first client 131/132 into UPF 111. The N3 interface may be implemented using any suitable tunneling protocol, such as General Packet Radio Services (GPRS) tunneling protocol (GTP), etc. UPF 111 may connect with data network 160 via an N6 interface.

Universal gateway 110 may be configured to have Internet Protocol (IP) connectivity with 5G core network control plane 150, which may be configured to be a policy decision point (PDP). In the 5G system architecture, control plane functions 150 are separated from user plane functions provided by UPF 111 to facilitate independent scalability, evolution, and flexible deployments. Control plane 150 may include any suitable entities, such as session management function (SMF) 151, access and mobility management function (AMF) 152, etc. AMF 152 may be connected to second client 141 and gNB 142 via the N1 and N2 interfaces respectively. Control plane 150 is capable of interacting with integrated management plane 190, as well as unified data management (UDM) and/or unified data repository (UDR) 170 from which subscription data associated with client 131/132/141 is stored.

Policy-Aware Traffic Forwarding

According to examples of the present disclosure, a computer system capable of acting as universal gateway 110 may be configured to perform policy-aware traffic forwarding for multiple types of network traffic, such as 5G, Wi-Fi and wired/Ethernet traffic. This should be contrasted against conventional approaches that rely on multiple gateways to handle policy enforcement for different types of network traffic and the need to provision different policies for those gateways. Using examples of the present disclosure, policy enforcement may be performed more consistently and/or efficiently for multiple types of network traffic. In practice, examples of the present disclosure may be implemented to provide customers with a single provisioning endpoint for policy and/or a single unified control point for traffic from multiple types of network traffic.

Figure 2:
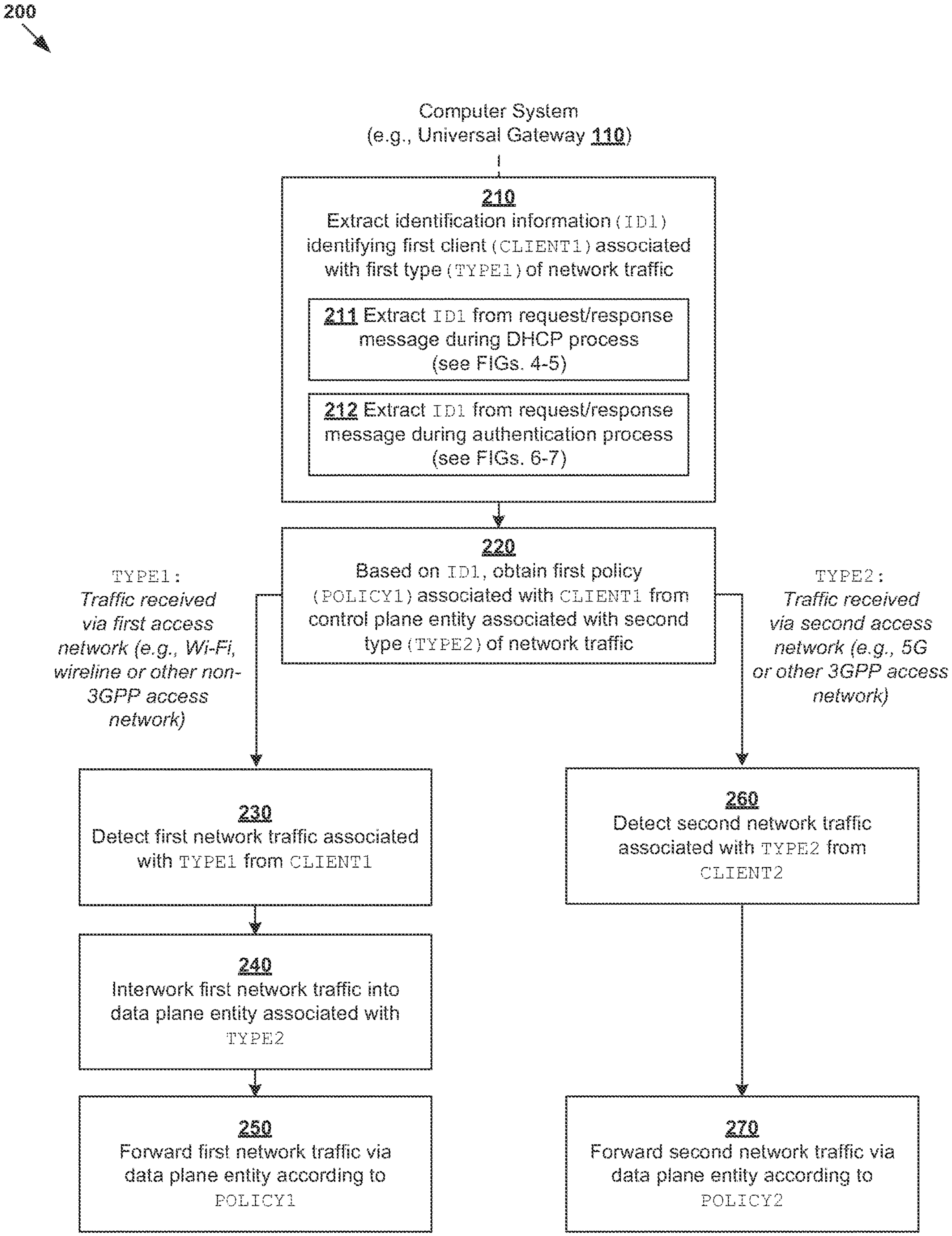
FIG. 2 is a flowchart of an example process for a computer system to perform policy-aware traffic forwarding for multiple types of network traffic.

In more detail, FIG. 2 is a flowchart of example process 200 for computer system 110 to perform policy-aware traffic forwarding for multiple types of network traffic. Example process 200 may include one or more operations, functions, or actions illustrated by one or more blocks, such as 210 to 270. Depending on the desired implementation, various blocks may be combined into fewer blocks, divided into additional blocks, and/or eliminated. As will be explained further using FIGS. 9-10, examples of the present disclosure may be implemented using any suitable computer system that includes software and/or hardware component(s) capable of acting as universal gateway 110.

At 210 in FIG. 2, universal gateway 110 (e.g., UIWF 112) may extract identification information identifying first client 131/132 associated with a first type of network traffic. For example, first client 131/132 may be associated with Wi-Fi, wired/Ethernet or any other non-5G traffic, and connected to universal gateway 110 via a "first access network" (e.g., AP/WLC 121 or other non-3GPP access network).

At 220, universal gateway 110 (e.g., UIWF 112) may obtain a first policy associated with first client 131/132 based on the identification information. For example, the first policy may be obtained from control plane 150 (e.g., SMF 151) associated with the second type of network traffic, such as 5G traffic. The term "obtain" may refer generally to universal gateway 110 retrieving or receiving the first policy from control plane 150, or a datastore associated with control plane 150.

At 230-240 in FIG. 2, in response to detecting first network traffic of the first type (e.g., Wi-Fi traffic) from first client 131/132, universal gateway 110 (e.g., UIWF 112) may interwork the first network traffic into UPF 111. At 250, the first network traffic may be forwarded towards data network 160 via UPF 111 according to the first policy (denoted as POLICY1 in FIG. 2). As used herein, the term "network traffic" may refer generally to bits that may be transported, such as in the form of packets, segments, protocol data units (PDUs), etc.

At 260-270 in FIG. 2, in response to detecting second network traffic of the second type from second client 141, universal gateway 110 may forward the second network traffic towards data network 160 via UPF 111 according to a second policy associated with second client 141 (denoted as POLICY2 in FIG. 2). Depending on the desired implementation, POLICY2 associated with 5G client 141 may be obtained from 5G control plane 150 (e.g., SMF 151) using any suitable approaches described in the 3GPP standards, such as according to session management procedures for 5G clients described in section 4.3 in TS 23.502 incorporated herein by reference, etc.

As used herein, the term "policy" (e.g., first policy and second policy) may refer generally to a set of rule(s), parameter(s) or instruction(s) that are applicable by universal gateway 110 during traffic forwarding. For example, a policy may be configured to restrict access by client 131/132/141 based on location information or time of day; restrict access to certain traffic types; restrict a maximum traffic rate, etc. Depending on the desired implementation, the first policy and/or second policy may be configured based on any suitable QoS model, such as the 5G QoS model that defines guaranteed flow bit rate (GBR) QoS flows and non-GBR QoS flows. In this case, the first policy and/or second policy may include QoS parameter(s) or information mappable to the QoS parameter(s).

Example QoS parameters may include: (1) QoS flow ID (QFI) or 5G QoS ID (501) that identifies a QoS flow; (2) allocation and retention priority (ARP); (3) reflective QoS attribute (RQA) for non-GBR flows; (4) flow bit rate; (5) aggregate bit rate; and (6) maximum packet loss. Flow bit rate may include guaranteed flow bit rate (GFBR) and/or maximum flow bit rate (MFBR). Aggregate bit rate may include per UE aggregate maximum bit rate (UE-AMBR) and/or per session AMBR (session-AMBR). In practice, the QoS flow is the finest granularity of QoS differentiation in a PDU session. A OFI is used to identify a QoS flow in the 5G system. User plane traffic associated with the same OFI within a PDU session may receive the same traffic forwarding treatment.

Depending on the desired implementation, the first policy and/or second policy may be enforced or applied during traffic forwarding based on any suitable packet handling instruction(s) obtained by universal gateway 110 from SMF 151, such as (1) packet detection rules (PDRs) relating to traffic classification arriving at UPF 111; (2) forwarding action rules (FARs) relating to forwarding, dropping or buffering traffic identified by PDR(s); (3) QoS enforcement rules (QERs) relating to QoS enforcement of traffic identified by PDR(s), etc. During traffic forwarding, the policy may be applied or enforced by universal gateway 110 using UPF 111 and/or UIWF 112. Policy enforcement may be performed for uplink and/or downlink traffic.

Overview of Examples

Two examples or embodiments will be described using FIGS. 3A-3B, which are schematic diagrams of respective first example 300 and second example 301 of policy-aware traffic forwarding for multiple types of network traffic. Although explained using Wi-Fi client 131 and AP/WLC=121, note that the examples below may be implemented for first client=wired/Ethernet client 132 using first access network=AP/WLC 122.

(a) First Example (See 211 in FIG. 2, and FIGS. 3A, 4-5)

According to a first example, block 210 may be performed during an IP address assignment process using dynamic host configuration protocol (DHCP). In this example, universal gateway 110 may include DHCP server 301 to provide IP address assignment and lease renewal services for first client 131. At 310, during an IP address assignment process, universal gateway 110 may extract identification information (denoted as ID1) associated with first client 131 from DHCP packet(s).

Figure 3A:
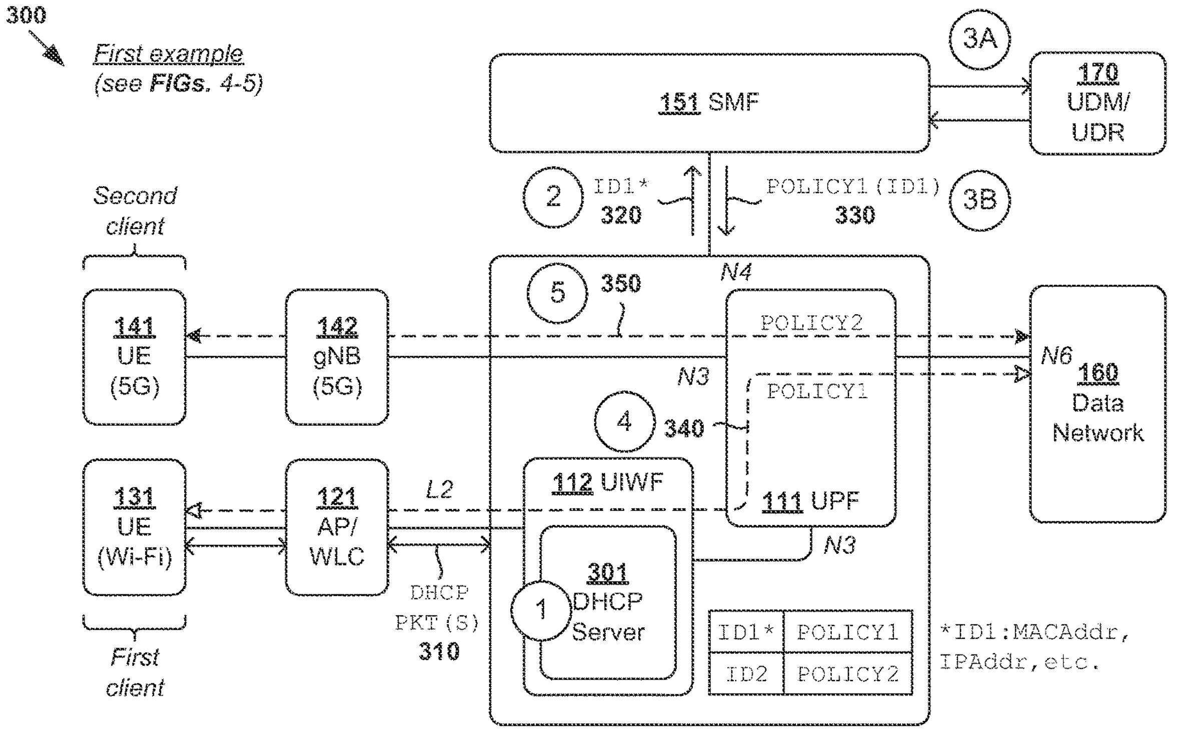
FIG. 3A is a schematic diagram of a first example of policy-aware traffic forwarding for multiple types of network traffic.

At 320 in FIG. 3A, the identification information may be sent towards SMF 151 in, for example, a PDU session establishment request. This way, SMF 151 may retrieve subscriber data that includes POLICY1 from UDM/UDR 170 based on ID1, which may include a media access control (MAC) address assigned to first client 131, etc. At 330, universal gateway 110 may obtain POLICY1 from SMF 151, such as in N4 session establishment request(s).

At 340 in FIG. 3A, in response to detecting first traffic from first client 131 via AP/WLC 121, universal gateway 110 may (a) interwork the first traffic into UPF 111 via an N3 interface, and (b) forward the first traffic towards data network 160 according to POLICY1. Further, at 350, in response to detecting second traffic from second client 141 via gNB 142, universal gateway 110 may forward the second traffic towards data network 160 via UPF 111 according to POLICY2. The first example in FIG. 3A will be explained further below using FIGS. 4-5.

(b) Second Example (See 212 in FIG. 2, and FIG. 3B, 6-7)

According to a second example, block 210 may be performed during an authentication process. In this example, universal gateway 110 may include an authentication, authorization and accounting (AAA) proxy agent 302 to provide AAA integration with enterprise AAA server 180. Compared to the first example in FIG. 3A, AAA proxy 302 in the second example in FIG. 3B may obtain additional and/or alternative identification information from AAA server 180, such as a chargeable-user identifier (CUID) for SMF 151 to retrieve policy from UDM/UDR 170. This way, universal gateway 110 may combine a policy that is obtained based on identification information from AAA server 180 with a policy from UDM/UDR 170 responsible for subscriber data management.

AAA proxy 302 may facilitate an authentication process using enterprise credential information (e.g., username, password, certificates, etc.) associated with first client 131/132. Depending on the desired implementation, any suitable authentication protocol(s) may be used during the authentication process, such as extensible authentication protocol (EAP), EAP Tunneled Transport Layer Security (EAP-TTLS), EAP Flexible Authentication via Secure Tunneling (EAP-FAST), Protected Extensible Authentication Protocol (PEAP), Remote Authentication Dial-In User Service (RADIUS), etc. In practice, RADIUS is a networking protocol that provides centralized AAA management for clients to connect to data network 160.

Figure 3B:
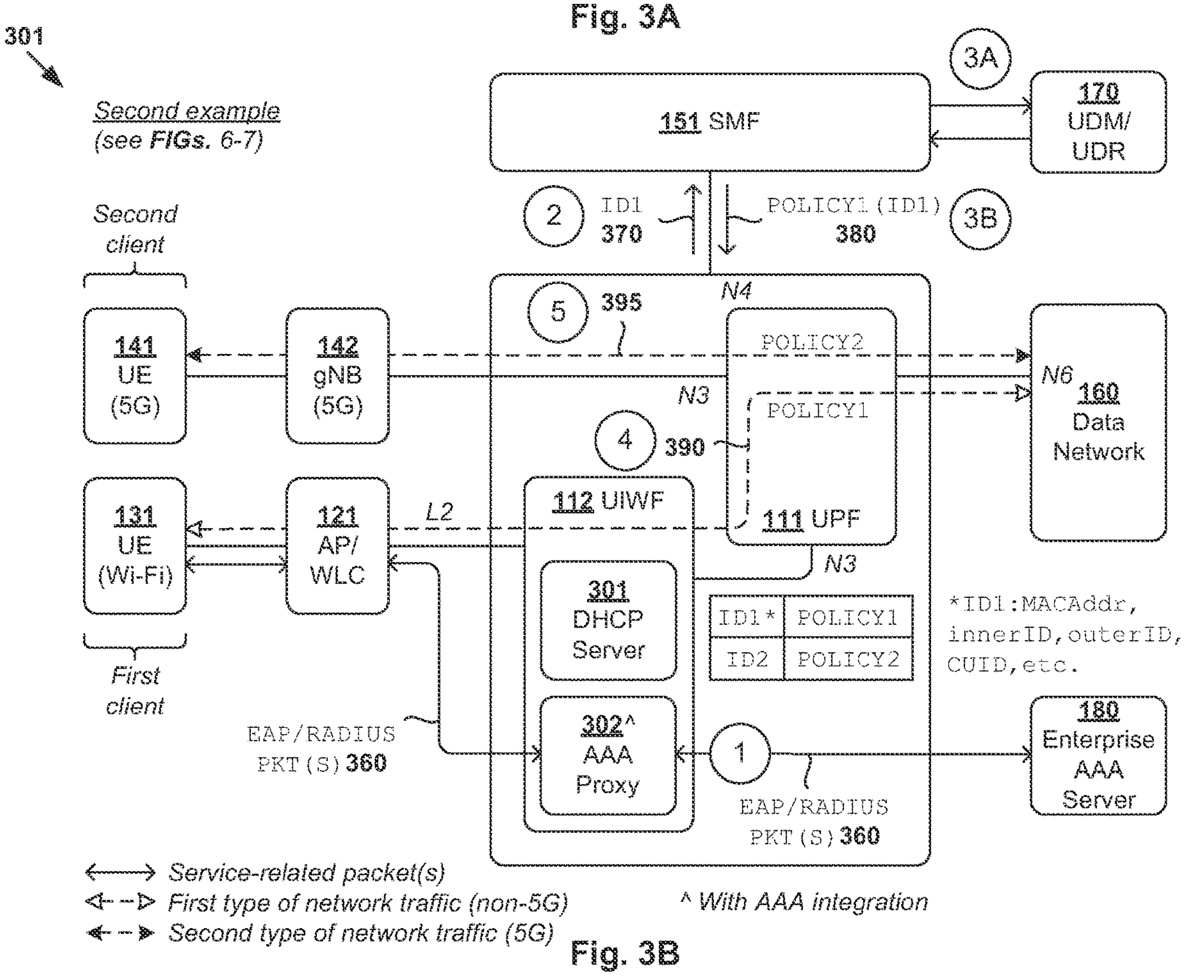
FIG. 3B is a schematic diagram of a second example of policy-aware traffic forwarding for multiple types of network traffic.

At 360 in FIG. 3B, during an authentication process, universal gateway 110 may extract identification information (denoted as ID1) associated with first client 131 from EAP/RADIUS packet(s) to/from AAA server 180. For example, AAA proxy 302 may extract ID1 from an access-accept message indicating a successful authentication from AAA server 180. At 370, universal gateway 110 may send ID1 towards SMF 151. In this case, ID1 may include one or more of the following fields extractable from EAP/RADIUS packet(s): MAC address, inner ID, outer ID and CUID. In practice, if AAA server 180 is not involved (i.e., no AAA integration), a default policy may be used.

At 380 in FIG. 3A, universal gateway 110 may obtain POLICY1 associated with ID1 from SMF 151. At 390, in response to detecting first traffic from first client 131 via AP/WLC 121, universal gateway 110 may (a) interwork the first traffic into UPF 111, and (b) forward the first traffic towards data network 160 via UPF 111 according to POLICY1. Further, at 395, in response to detecting second traffic from second client 141 via gNB 142, universal gateway 110 may forward the second traffic towards data network 160 via UPF 111 according to POLICY2. The second example in FIG. 3B will be explained further below using FIGS. 6-7.

Universal gateway 110 according to examples of the present disclosures should be contrasted against conventional approaches, such as non-3GPP interworking function (N3IWF) and trusted non-3GPP gateway function (TNGF) defined by the 3GPP standards. For example, universal gateway 110 does not necessitate the use of subscriber identity module (SIM) or universal subscriber identity module (USIM) with UDM/UDR 170. Instead, existing enterprise credential information may be used in an authentication process implemented using AAA proxy 302 and enterprise AAA server 180 in the second example in FIG. 3B.

In another example, the signaling mechanisms implemented by universal gateway 110 during session establishment or deletion with the 5G data plane should be contrasted against conventional approaches that necessitate interactions with AMF 152. By interacting with SMF 151 instead of AMF 152, the signaling mechanisms may be simplified to improve the total time to complete session establishment or deletion requests in the examples in FIGS. 3A-B, thereby improving performance. In a further example, universal gateway 110 may bridge both Wi-Fi client 131 and wired client 132 to a 5G core network.

First Example: Session Establishment Process

Figure 4:
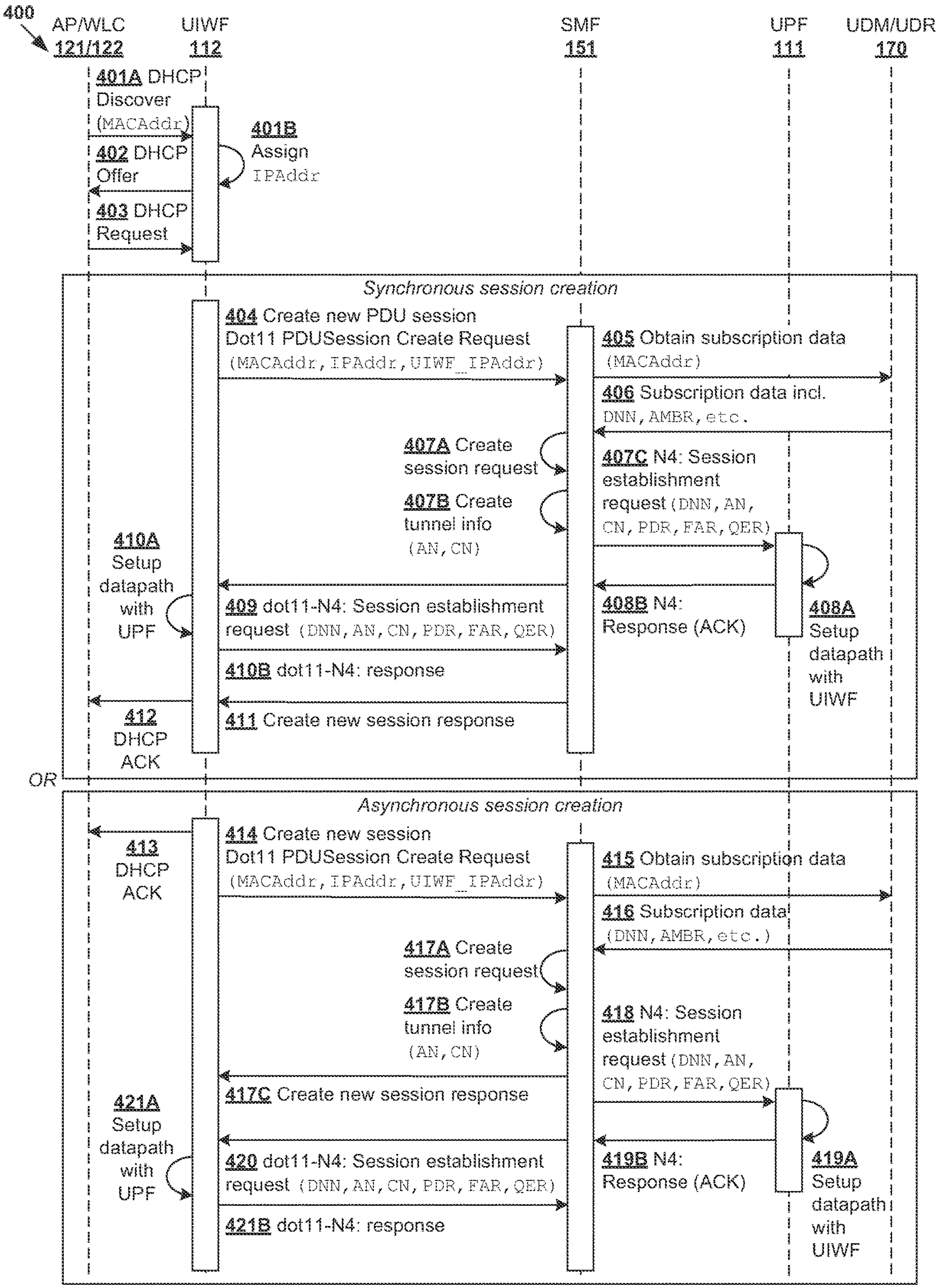
FIG. 4 is a flowchart of an example session establishment process according to the first example in FIG. 3A.

FIG. 4 is a flowchart of example session establishment process 400 according to the first example in FIG. 3A. Example process 400 may include one or more operations, functions, or actions illustrated by one or more blocks, such as 410 to 421B. Depending on the desired implementation, various blocks may be combined into fewer blocks, divided into additional blocks, and/or eliminated. In the following, it is assumed that an authentication procedure (see FIGS. 6-7) is completed.

(a) DHCP Process

According to examples of the present disclosure, UIWF 112 may include DHCP server 301 to facilitate IP address assignment using any suitable protocol, such as DHCP version 4 and/or version 6, etc. In practice, DHCP is a protocol that involves multiple transactions between DHCP server 301 and a DHCP client using both broadcast and unicast packets. DHCP operations generally fall into four phases: (1) a DHCP client performing DHCP server discovery by broadcasting a DHCP discover message to reach DHCP server(s); (2) the DHCP server performing IP lease offer by sending a DHCP offer message; (3) the DHCP client accepting the offer by broadcasting a DHCP request message; and (4) the DHCP server returns a DHCP acknowledgement (ACK) or negative ACK (NACK) message to the DHCP client. During IP lease renewal, the DHCP client may broadcast another DHCP request message.

At 401A in FIG. 4, first client 131/132 may initiate a session establishment process by generating and sending an IP address assignment request message (e.g., DHCP discover message) towards UIWF 112. In practice, UIWF 112 may be on the same layer-2 network (e.g., VLAN) as first client 131/132. Here, AP/WLC 121/122 may bridge traffic from first client 131/132 to a layer-2 network to which UIWF 112 is connected. UIWF 112 also has IP connectivity to SMF 151 and UPF 111 (to be explained further using FIGS. 9-10).

At 401B in FIG. 4, in response to detecting the DHCP discover message, DHCP server 301 of UIWF 112 may check or determine whether the request is for a new IP address assignment or renewal of an assigned IP address. At 402-403, if the request is for a new IP address assignment, UIWF 112 may respond with a DHCP offer message, to which first client 131/132 may reply with a DHCP request message. Further, in response to determination that the request is for a new IP address assignment, UIWF 112 may initiate a PDU session establishment process with 5G control plane 150, particularly SMF 151.

Two scenarios are shown in FIG. 4: (a) synchronous session establishment according to blocks 404-412 and (b) asynchronous session establishment according to blocks 413-421B. Note that blocks 404-411 in the synchronous case are similar to blocks 414-421B in the asynchronous case. In the synchronous case, a DHCP ACK message (see 412) is not sent until both the upstream (i.e., uplink) and downstream (i.e., downlink) datapaths are set up. In contrast, in the asynchronous case, a DHCP ACK message (see 413) is sent immediately while both the upstream and downstream datapaths are being set up.

(b) Synchronous Session Establishment

In more detail, at 404 in FIG. 4, UIWF 112 may generate and send, towards SMF 151, a request for a PDU session establishment. As defined in the 3GPP TS 23.501, a "PDU session" may refer generally to an association between a UE (e.g., client 131/132) and data network 160 that provides a PDU connectivity service, which provides exchange of PDUs between the UE and data network 160. In practice, the PDU session establishment request may include any suitable information, such as client MAC address (denoted as MACAddr) and client IP address (denoted as IPAddr) associated with client 131/132, as well as N3 tunnel IP address associated with UIWF 112 (denoted as UIWF_IPAddr). The request may be for any suitable PDU session type, such as IPv4, IPv6, IPv4v6, Ethernet or unstructured.

At 405-406 in FIG. 4, in response to receiving the PDU session establishment request from UIWF 112, SMF 151 may obtain user subscription data associated with first client 131/132 from UDM/UDR 170. Note that the subscription data may be retrieved based on any suitable identification information, such as the client MAC address (MACAddr) or a username associated with first client 131/132. Alternatively, the subscription data may be retrieved using identification information that is independent of the client MAC address (MACAddr).

Depending on the desired implementation, SMF 151 may be responsible for checking whether the PDU session establishment request from UIWF 112 is compliant with the subscription data. The subscription data from UDM/UDR 170 may include a data network name (DNN) and policy information that is appliable to the established PDU session. The policy information may specify QoS parameter(s) or information mappable to the QoS parameter(s), such as UE-AMBR, session-AMBR, default 501 and default ARP, where available.

In practice, the UE-AMBR limits the aggregate bit rate that can be expected to be provided across all non-GBR QoS flows of a particular UE. The session-AMBR limits the aggregate bit rate that can be expected to be provided across all non-GBR QoS flows for a particular PDU session. The 5QI parameter is a scalar that is used to reference a set of 5G QoS characteristics, such as resource type (GBR, delay-critical GBR or non-GBR), priority level, packet delay budget, packet error rate, averaging window, maximum data burst volume, etc. The ARP contains information about a priority level associated with a QoS flow, pre-emption capability and pre-emption vulnerability.

At 407A-B in FIG. 4, SMF 151 may generate or create N4 session establishment requests along with tunneling information, such as access network (AN) tunnel information, core network (CN) tunnel information, etc. The AN tunnel information may include an access network address of an N3 tunnel corresponding to the PDU session to be established. The CN tunnel information may include a core network address of a N3/N9 tunnel corresponding to the PDU session.

At 407C in FIG. 4, SMF 151 may send a first N4 session establishment request to UPF 111 to cause UPF 111 to establish a session towards UIWF 112. At 408A-B, in response to receiving the request from SMF 151, UPF 111 may set up a first datapath with UIWF 112 and send an ACK response to SMF 151. Further, at 409, SMF 151 may send a second N4 session establishment request to UIWF 112 to cause UIWF 112 to establish a session towards UPF 111.

At 410A-B in FIG. 4, in response to receiving the request from SMF 151, UIWF 112 may set up a second datapath with UPF 111 and send an ACK response to SMF 151. The N4 session establishment request from SMF 151 may also include packet handling instructions, such as PDR(s) for traffic classification, FAR(s) for forwarding, dropping or buffering traffic that is identified using the PDR(s), QER(s) for QoS enforcement of traffic identified using the PDR(s), etc.

At 411 in FIG. 4, once the upstream and downstream datapaths are set up, SMF 151 may generate and send a response to UIWF 112 in reply to the PDU session creation request at block 404. Further, at 412, UIWF 112 may generate and send a DHCP ACK towards first client 131/132 in reply to the DHCP request at block 403.

(c) Asynchronous Session Establishment

Alternatively, at 413 in FIG. 4, UIWF 112 may generate and send a DHCP ACK message towards first client 131 in response to the DHCP request message at block 403 as the upstream and downstream datapaths are being established. Note that blocks 414-421B in the asynchronous case are similar to blocks 404-411 in the synchronous case. As such, implementation details discussed using blocks 404-411 are also applicable here and will not be repeated for brevity.

In the asynchronous case, however, if the datapath creation process fails, first client 131/132 would have an IP address that cannot be tunneled towards data network 160 via an N6 interface. In this case, in response to detecting traffic from first client 131/132, AP/WLC 121/122 or UIWF 112 will drop the traffic, thereby blocking its access to data network 160.

(d) Session Deletion Process

Figure 5:
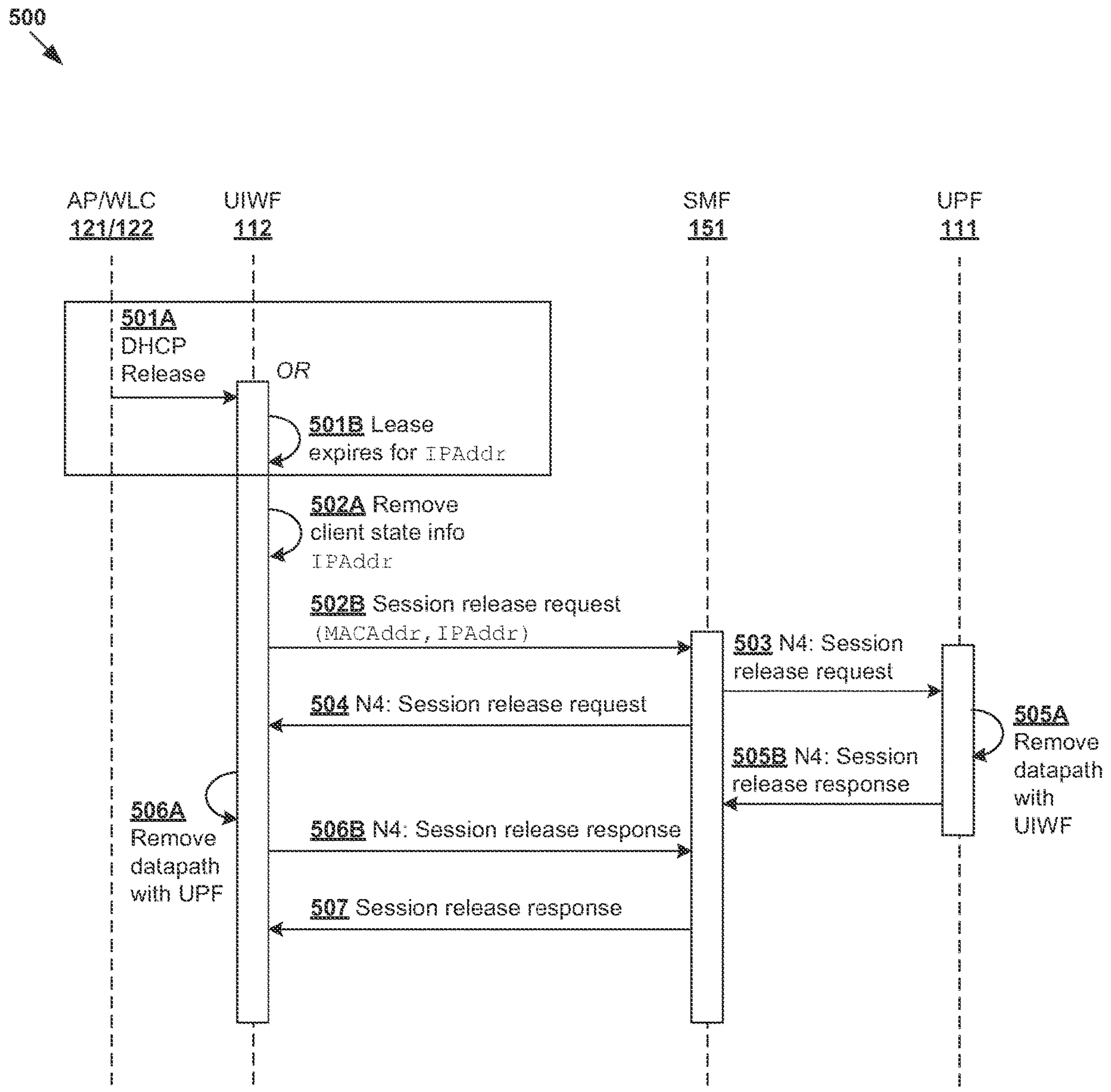
FIG. 5 is a flowchart of an example session deletion process according to the first example in FIG. 3A.

FIG. 5 is a flowchart of example session deletion process 500 according to the first example in FIG. 3A. Example process 500 may include one or more operations, functions, or actions illustrated by one or more blocks, such as 501A to 507. Depending on the desired implementation, various blocks may be combined into fewer blocks, divided into additional blocks, and/or eliminated.

In the example in FIG. 5, a session deletion may be triggered by block 501A or block 501B. In a first example (see 501A), DHCP server 301 at UIWF 112 may detect a DHCP release message from first client 131/132. In a second example (see 501B), DHCP server 301 at UIWF 112 may detect that a DHCP lease for a client IP address (IP Addr) has expired because its lease has not been renewed by first client 131/132.

At 502A-B in FIG. 5, in response to either block 501A or 501B, UIWF 112 may remove any state information associated with first client 131/132, as well as generating and sending a session release request to SMF 151. The session release request may include any suitable information, such as client MAC address (MACAddr) and client IP address (IPAddr) associated with first client 131/132.

At 503-504 in FIG. 5, in response to receiving the session release request from UIWF 112, SMF 151 may generate and send a first N4 session release request to UPF 111 and a second N4 session release request to UIWF 112. In response, at 505A-B, UPF 111 may remove or delete the client datapath that is established at block 408A/419A in FIG. 4 and respond to SMF 151 accordingly. Similarly, at 506A-B, UIWF 112 may remove the client datapath that is established at block 410A/421A in FIG. 4 and respond to SMF 151 accordingly.

Second Example: Authentication Process

According to examples of the present disclosure, universal gateway 110 may be configured to interact with enterprise AAA server 180 facilitate an authentication process involving first client 131/132. Using the example in FIG. 1, universal gateway 110 may include a proxy agent in the form of AAA proxy 302 to facilitate an authentication process that involves an exchange of messages between (a) first client 131/132 or AP/WLC 121/122 and (b) enterprise AAA server 180. In one example, AAA proxy 302 may relay messages between first client 131/132 and enterprise AAA server 180 without modifying the messages. Two scenarios will be explained below using FIG. 6 (successful authentication) and FIG. 7 (failed authentication).

(a) Successful Authentication

Figure 6:
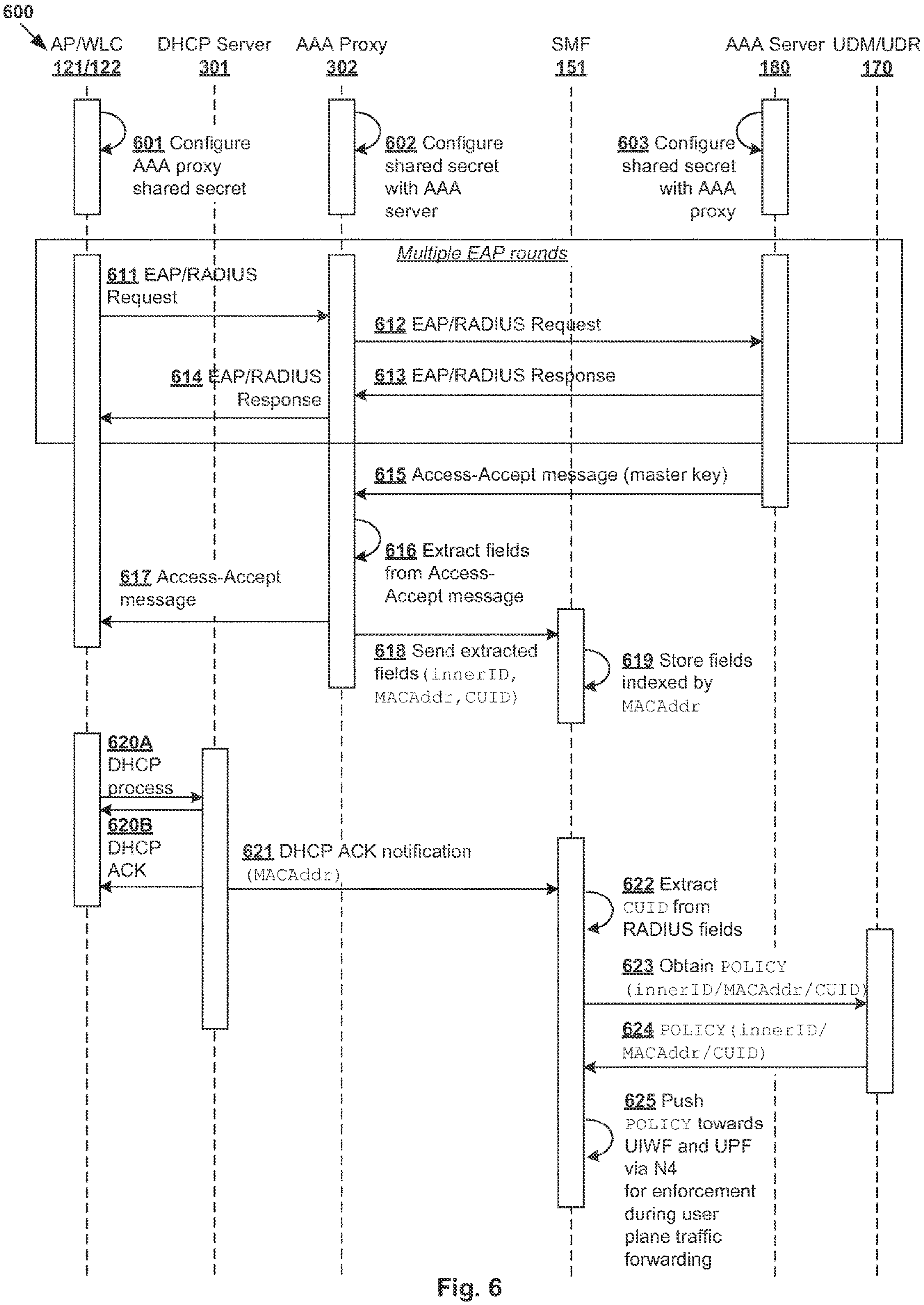
FIG. 6 is a flowchart of an example successful authentication process according to the second example in FIG. 3B.

FIG. 6 is a flowchart of example successful authentication process 600 according to the second example in FIG. 3B. Example process 600 may include one or more operations, functions, or actions illustrated by one or more blocks, such as 601 to 625. Depending on the desired implementation, various blocks may be combined into fewer blocks, divided into additional blocks, and/or eliminated.

At 601-603 in FIG. 6, various configurations may be performed to provision AP/WLC 121/122 with 5GC AAA proxy 302 as a proxy server, and to provision AAA proxy 302 with external AAA server 180. For authentication purposes, a shared key (shared secret) may be configured between AP/WLC 121/122 and AAA proxy 302, as well as between AAA proxy 302 and enterprise AAA server 180.

At 611-612 in FIG. 6, in response to detecting an EAP/RADIUS request message for authentication from AP/WLC 121/122 associated with first client 131/132, AAA proxy 302 may relay or forward the EAP/RADIUS request message towards AAA server 180. At 613-614, in response to detecting an EAP/RADIUS response message from AAA server 180, AAA proxy 302 may relay or forward the EAP/RADIUS response message towards AP/WLC 121/122.

Depending on the desired implementation, the EAP/RADIUS request message may include any suitable enterprise credential information that requires authentication by AAA server 180, such as enterprise username, password, certificate information, etc. This should be contrasted against conventional approaches that necessitate SIM/USIM authentication with 5G UDM/UDR 170. Any suitable number of EAP rounds involving blocks 611-614 may be performed.

At 615 in FIG. 6, in the event that authentication is successful, enterprise AAA server 180 may generate and send an access-accept message towards AAA proxy 302. The access-accept message may include any suitable information, including key information, EAP inner ID, EAP outer ID, calling-station ID (client MAC address) and CUID. The EAP inner ID may include a username when EAP methods such as EAP-TTLS, EAP-FAST and PEAP are used.

At 616 in FIG. 6, in response to detecting the access-accept message from enterprise AAA server 180, AAA proxy 302 may extract identification information associated with first client 131/132 from the access-accept message, such as key fields that include EAP inner ID, EAP outer ID, calling-station ID and CUID. At 617, AAA proxy 302 may forward the access-accept message towards AP/WLC 121/122. At 618, AAA proxy 302 may forward the extracted identification information towards SMF 151. At 619, SMF 151 may store the identification information in a table indexed by the client MAC address.

At 620A-B in FIG. 6, first client 131/132 may initiate a DHCP process with DHCP server 301 of UIWF 112 to request for an IP address assignment. At the end of the DHCP process, DHCP server 301 generate and send a DHCP ACK message towards first client 131/132. Examples relating to the DHCP process have been explained using FIGS. 4-5 and will not be repeated here for brevity. Further, at 621, UIWF 112 may forward the DHCP ACK message to SMF 151.

At 622 in FIG. 6, SMF 151 may extract the client MAC address from the DHCP ACK message and correlate it with the identification information (e.g., extracted fields) stored at block 619. At 623-624, SMF 151 may obtain a policy based on any suitable identification information associated with first client 131/132. At 625, SMF 151 may push the policy towards UIWF 112 and/or UPF 111 for enforcement during traffic forwarding. For example, the policy may be retrieved based on (a) the client MAC address associated with first client 131/132, (b) an inner ID, (c) both the client MAC address and inner ID, etc. If no policy is configured for a particular client, a default policy may be obtained and enforced.

(b) Failed Authentication

Figure 7:
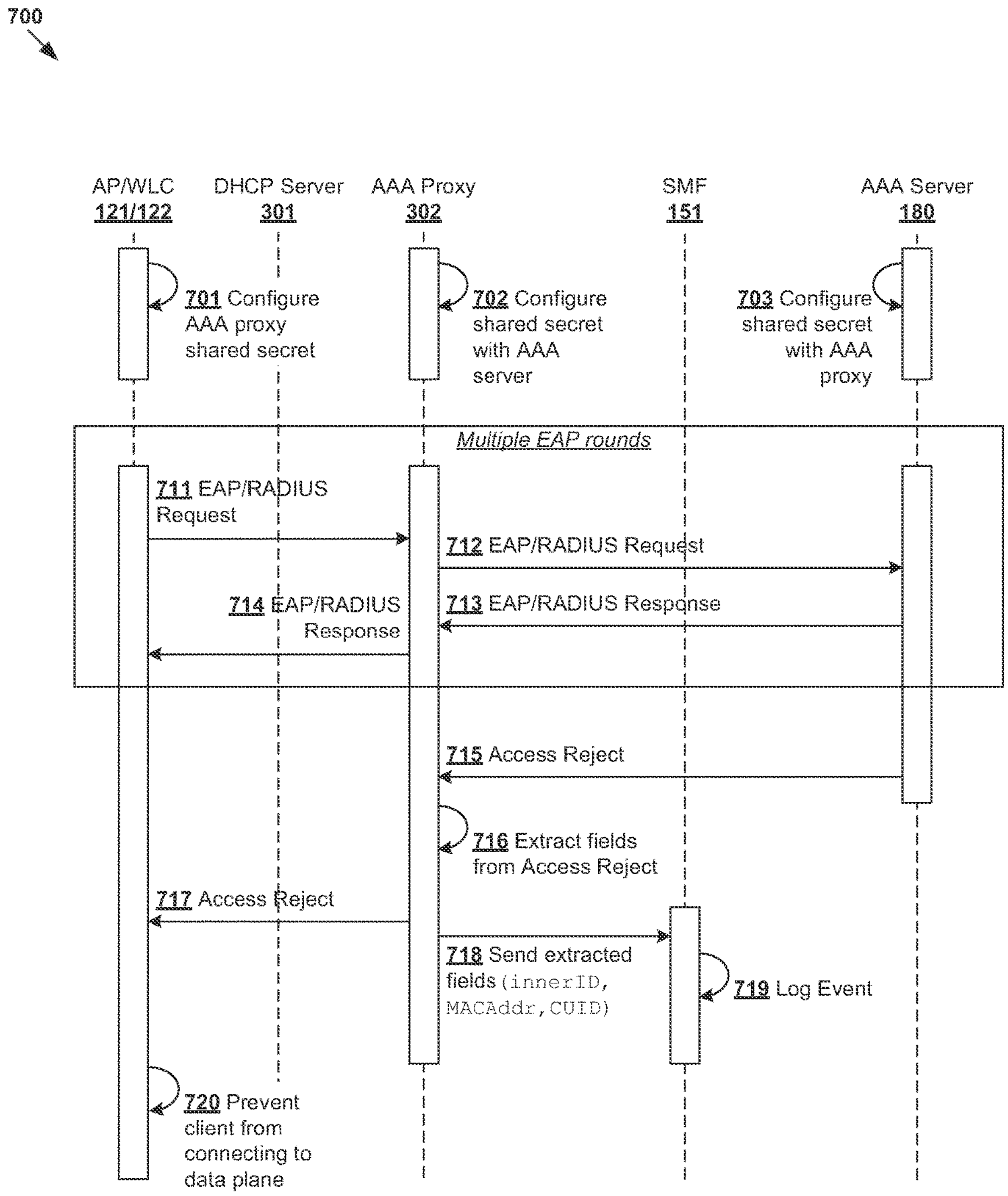
FIG. 7 is a flowchart of an example failed authentication process according to the second example in FIG. 3B.

FIG. 7 is a flowchart of example failed authentication process 700 according to the second example in FIG. 3B. Example process 700 may include one or more operations, functions, or actions illustrated by one or more blocks, such as 701 to 720. Depending on the desired implementation, various blocks may be combined into fewer blocks, divided into additional blocks, and/or eliminated. Blocks 701-714 in FIG. 7 are similar to blocks 601-614 in FIG. 6, the explanation of which is also applicable here and will not be repeated for brevity.

At 715-717 in FIG. 7, in response to receiving an access-reject message indicating an authentication failure event, UIWF 112 may extract fields from the access-reject message and forward the message towards AP/WLC 121/122. At 718-719, UIWF 112 may report the authentication failure event to SMF 151, which may in turn log the event. At 720, client 131/132 may be prevented from connecting to UPF 111. Assuming correct behavior from the non-5G (e.g., Wi-Fi) system, UIWF 112 should not see any DHCP message from client 131/132 who has failed authentication.

Change of Authorization (CoA) or Packet of Disconnect (PoD)

Figure 8:
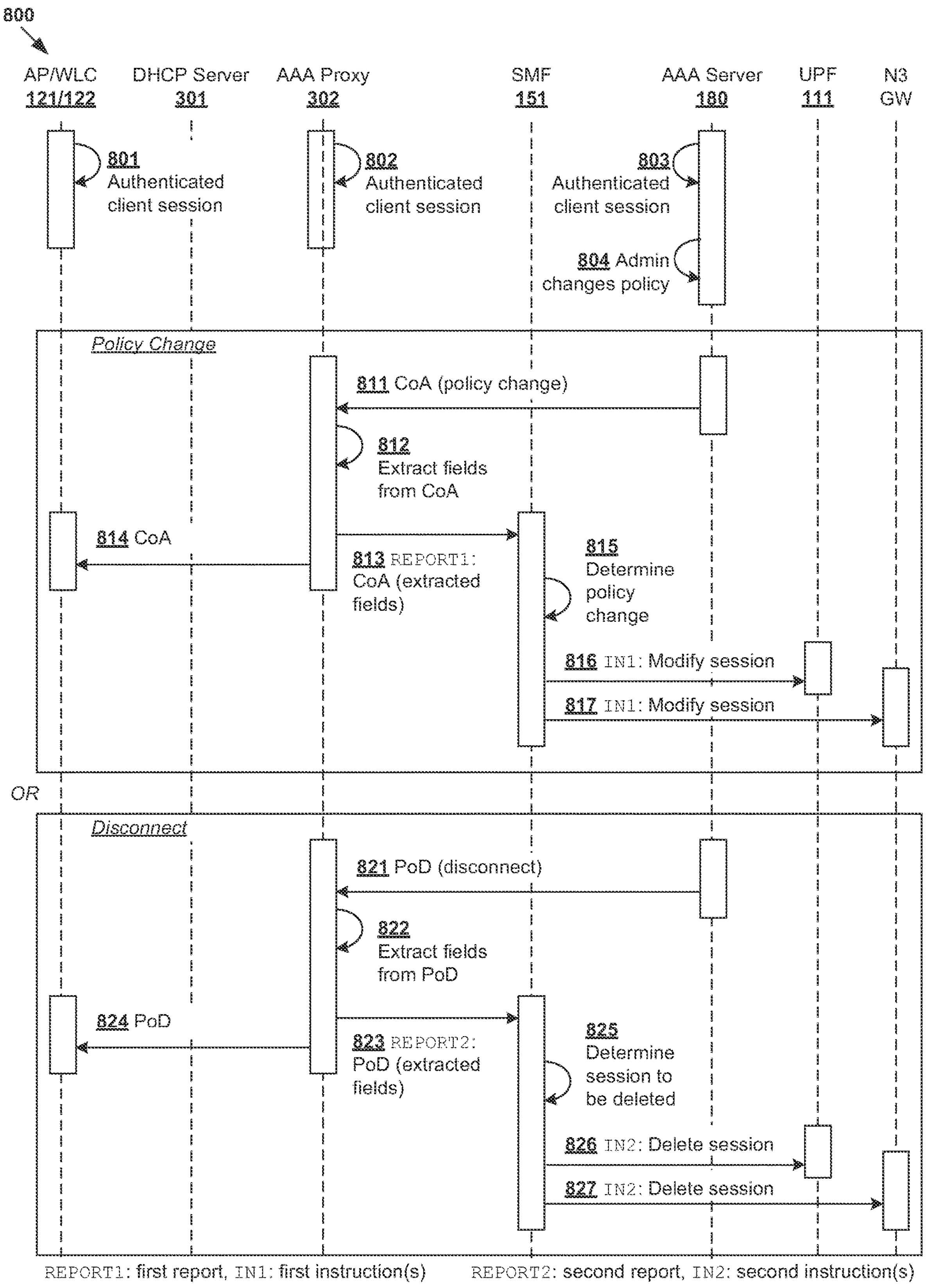
FIG. 8 is a flowchart of an example change of authorization (CoA) or packet of disconnect (PoD)

FIG. 8 is a flowchart of example change of authorization (CoA) or packet of disconnect (PoD) 800. Example process 800 may include one or more operations, functions, or actions illustrated by one or more blocks, such as 801 to 827. Depending on the desired implementation, various blocks may be combined into fewer blocks, divided into additional blocks, and/or eliminated. In this example, at 801-803, first client 131/132 has been successfully authenticated according to the example in FIG. 6.

At 804 in FIG. 8, enterprise AAA server 180 (e.g., under the control of a network administrator) may initiate a policy change dynamically via a RADIUS CoA message or releasing first client 131/132 via a PoD message. In practice, the RADIUS CoA message provides a mechanism to change authorization dynamically after first client 131/132 has been authenticated.

(a) CoA Message

At 811-812 in FIG. 8, in response to detecting a CoA message indicating a policy change, AAA proxy 302 on UIWF 112 may extract fields from the CoA message. At 813, AAA proxy 302 may generate and send a first report (denoted as REPORT1) reporting the CoA message and/or its extracted fields to SMF 151. The first report is to cause blocks 815-817 below. At 814, the CoA message is also sent towards AP/WLC 121/122.

At 815 in FIG. 8, SMF 151 may determine the policy change required and send first instruction(s) (denoted as IN1) to instruct universal gateway 110 to modify session information associated with first client 131/132. For example, at 816-817, in response to receiving IN1 caused by REPORT1, UPF 111 and N3 gateway (to be described using FIGS. 9-10) supported by universal gateway 110 may modify session information or update a policy associated with client 131/132 that has been previously successfully authenticated.

(b) PoD Message

At 821-822 in FIG. 8, in response to detecting a PoD message indicating a session termination, AAA proxy 302 on UIWF 112 may extract fields from the PoD message. At 823, AAA proxy 302 may generate and send a second report (denoted as REPORT2) reporting the PoD message and/or its extracted fields to SMF 151. At 824, the PoD message is also sent towards AP/WLC 121/122.

At 825, SMF 151 may determine an N3 session to be deleted, and send second instruction(s) (denoted as IN2) to instruct universal gateway 110 to terminate or delete the N3 session. For example, at 826-827, in response to receiving IN2 caused by REPORT2, UPF 111 and N3 gateway supported by universal gateway 110 may terminate the N3 session associated with client 131/132 between UPF 111 and the N3 gateway (see 1030 in FIG. 10).

System Configuration and Design

Depending on the desired implementation, any suitable "computer system" may be configured to perform various functions of universal gateway 110. Some example system designs for UIWF 112 will be explained below using FIGS. 9-10. It should be understood that any alternative and/or additional subnet(s), interface(s), IP address(es) or parameter(s) may be configured.

(a) First Example (No AAA Proxy)

Figure 9:
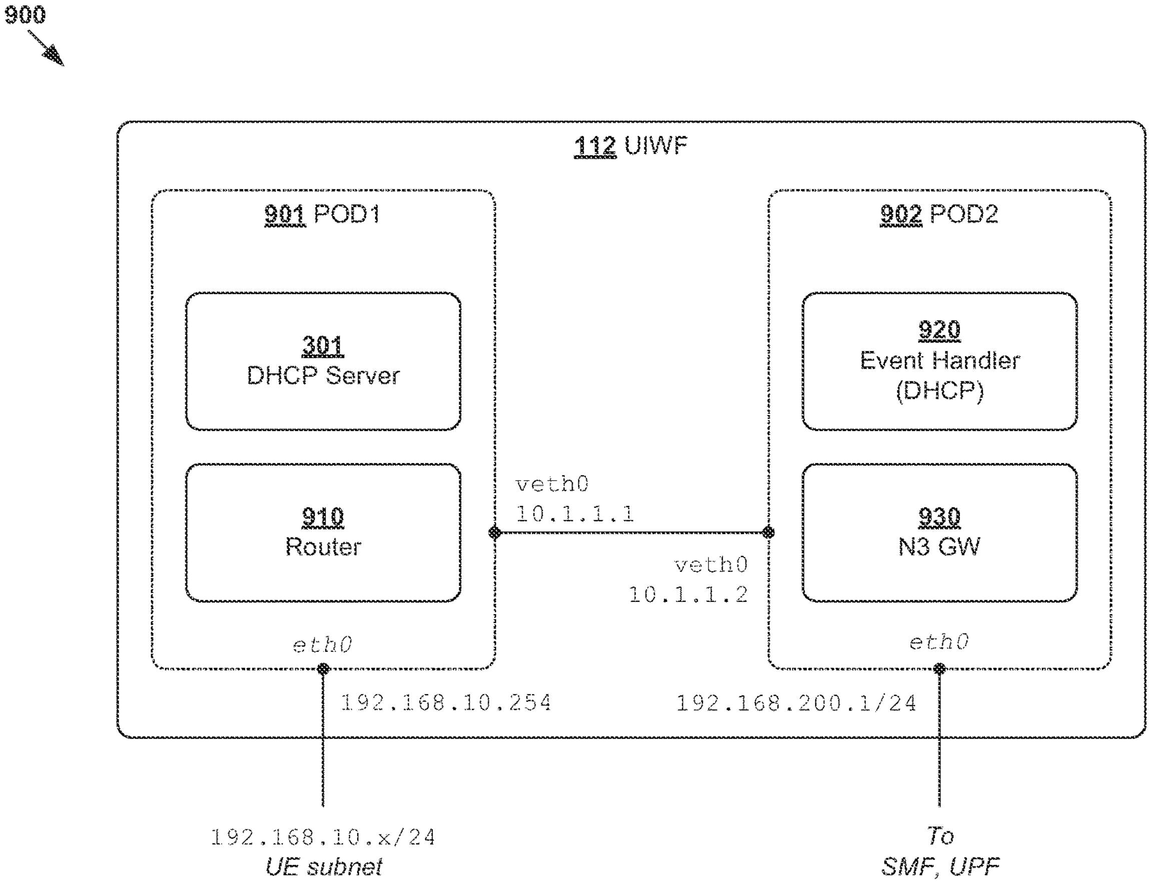
FIG. 9 is a schematic diagram of a first example system design of a universal gateway according to the first example in FIG. 3A.

FIG. 9 is a schematic diagram of first example system design 900 of universal gateway 110 according to the first example in FIG. 3A. In this example, universal gateway 110 does not include any AAA proxy agent to provide any integration with AAA server 180. In practice, an enterprise customer may not wish to connect UIWF 112 with AAA server 180 for various reasons. One reason is that the enterprise customer does not use 802.1x (e.g., pre-shared key (PSK) is used instead). Another reason is 802.1x is used but the enterprise customer might not trust universal gateway 110 to handle security credentials and integration with AAA server 180. In this case, SMF 151 may not have any AAA context associated with client 131/132. SMF 151 may operate in two ways in response to receiving a DHCP Accept triggered event: allow the session to be set up, or discard the session.

In the example in FIG. 9, UIWF 112 may include the following components: default router 910 for L2 clients 131-132, DHCP server 301, event handler 920 for handling DHCP events, and N3 gateway 930 that has N3 connectivity to UPF 111 and N4 connectivity to SMF 151. In one example configuration, UIWF 112 may include two pods: (a) POD1 901 that includes open source module(s) for router 910 and DHCP server 301, and (b) POD2 902 that includes event handler 920 and N3 gateway 930.

Router 910 in POD1 901 may be provide a native Linux routing service between interfaces in a multi-interface host. In addition to providing DHCP services to clients connected to interface=eth0, DHCP server 301 in POD1 901 may send DHCP events to event handler 920 in POD2 902. Event handler 920 in POD2 902 may receive events from DHCP server 301 in POD1 901 and provides a control plane interface to SMF 152 (similar to N11). N3 gateway 930 may tunnel incoming packets on veth0 (e.g., IP address=10.1.1.2) to UPF 111 using an N3-like interface. N3 gateway 930 may also have a control plane interface to UPF 111 (similar to N4).

Referring to example routing table 940 for POD1 901, router 910 may be configured to serve as a default router for 802.11 clients, such as clients on subset=192.168.10.x/24. POD1 901 and POD2 902 may communicate via respective veth0 interfaces. The default gateway for POD1 901 is POD2 902 using the veth0 interface. Referring to example routing table 950, POD2 902 may communicate with SMF 151 and UPF 111 using the eth0 interface associated with subnet=192.168.200.1/24.

(b) Second Example (with AAA Proxy)

Figure 10:
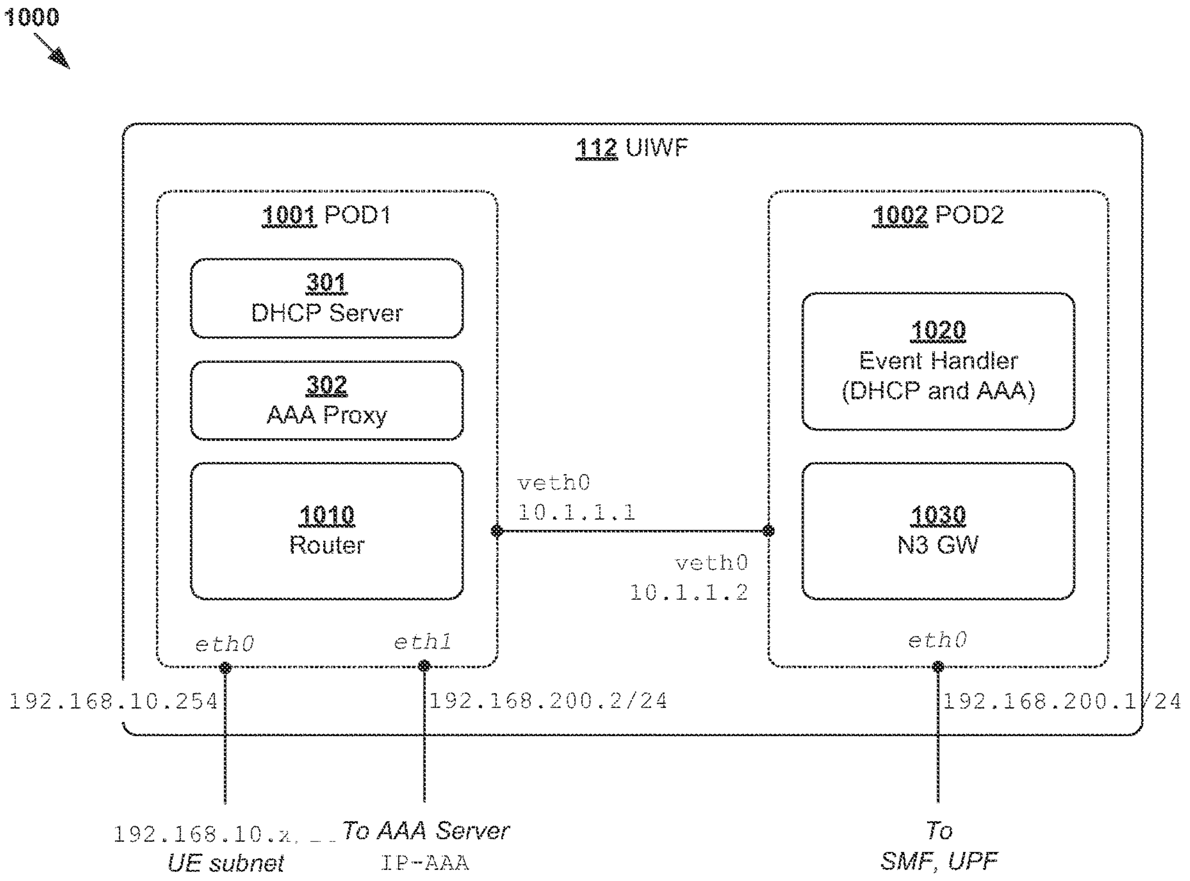
FIG. 10 is a schematic diagram of a second example system design of a universal gateway according to the second example in FIG. 3B.

FIG. 10 is a schematic diagram of second example system design 1000 of universal gateway 110 according to the second example in FIG. 3B. In this example, universal gateway 110 may be configured to include AAA proxy agent 302 to provide integration with AAA server 180 to facilitate authentication using enterprise credential information. In contrast to the example in FIG. 9, UIWF 112 in FIG. 10 may include AAA proxy 302 and event handler 1020 capable of handling both DHCP and AAA events.

In one example configuration, UIWF 112 may include two pods: (a) POD1 1001 that includes router 1010, DHCP server 301 and AAA proxy 302, and (b) POD2 1002 that includes event handler 1020 and N3 gateway 1030 capable of interfacing with SMF 151 and UPF 111. POD1 1001 may include a first interface (eth0) to connect with client subnet (s) and a second interface (eth1) to connect with AAA server 180. Note that eth1 in POD1 1001 may be on the same subnet as eth0 in POD2 1002, but not necessarily so. Default gateway may be assigned with IP address=192.168.200.254. Second routing table 950 in FIG. 9 is also applicable to POD2 1002.

For POD1 1001 in FIG. 10, its routing table may be modified to route packets between a RADIUS client (e.g., in AP/WLC 121/122 associated with first client 131/132) and AAA server 180. In this case, AP/WLC 121/122 may send packets towards AAA proxy 302 using destination IP address=192.168.10.254. AAA proxy 302 may send packets towards AAA server 180 using source IP address=192.168.200.2. Based on static route configuration, POD1 1001 may route packets to AAA server 180 (e.g., IP address=IP-AAA) using interface=eth1. Packets from AAA server 180 may be addressed to destination IP address=192.168.200.2. In response to receiving the packets on eth1 in POD1 1001, AAA proxy 302 may forward the packets to AP/WLC 121/122 using eth0.

Depending on the desired implementation, various parameters may be configured for the examples in FIGS. 9-10. For example, router 910/1010 may be configured as a default router for client subnet(s), such as virtual local area networks (VLANs). For DHCP server 301, example configuration parameters may include: subnet, IP pool configuration, lease time, default router, domain name system (DNS), option 82 for VLAN-based IP address, IP address of event handler 920/1020, etc.

For AAA proxy 302 in FIG. 10, example configuration parameters may include: access network subnet, shared secret to communicate with AP/WLC 121/122, AAA server's 180 IP address (denoted as IP-AAA), shared secret to communicate with AAA server 180, IP address of event handler 920/1020, etc. For event handler 920/1020, example configuration parameters may include: service-based interface (SBI) IP address or fully qualified domain name (FQDN) associated with SMF 151, client certificate to connect to SMF 151, N4 IP address associated with N3 gateway 930/1030, etc. Example configuration parameters for N3 gateway 930/1030 may include: N4 IP address or FQDN associated with SMF 151.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system including an interworking function on a data plane and a data plane entity associated with a second type of network traffic to perform policy-aware traffic forwarding for multiple types of network traffic that include a first type of network traffic and the second type of network traffic, comprising:

extracting, by the interworking function, identification information of a first client, wherein the first client is associated with the first type of network traffic, and the interworking function resides between the data plane entity and an access network connected to the first client;

based on the identification information, obtaining, by the interworking function, a first policy associated with the first client from a control plane entity associated with the second type of network traffic;

in response to detecting first network traffic of the first type from the first client, (a) interworking, by the interworking function, the first network traffic into the data plane entity, and (b) forwarding the first network traffic via the data plane entity according to the first policy associated with the first client; and in response to detecting second network traffic of the second type from a second client, forwarding the second network traffic via the data plane entity according to a second policy associated with the second client.

2. The method of claim 1, wherein obtaining the first policy comprises:

obtaining the first policy from a session management function (SMF) entity residing on the control plane associated with the second type of network traffic.

3. The method of claim 1, wherein extracting the identification information comprises:

extracting, using a proxy agent supported by the computer system, the identification information during an authentication process, wherein the identification information is extracted from one or more messages destined for or originating from an external authentication, authorization and accounting (AAA) server configured to authenticate the first client using credential information associated with the first client.

4. The method of claim 1, wherein extracting the identification information comprises:

extracting the identification information from a request message for an Internet Protocol (IP) address assignment using dynamic host configuration protocol (DHCP), or a response message in reply to the request message.

5. The method of claim 4, wherein obtaining the first policy comprises:

generating and sending, by the computer system to the control plane entity, a packet data unit (PDU) session establishment request that includes the identification information; and receiving, by the computer system from the control plane entity, one or more N4 session establishment requests specifying one or more parameters of the first policy.

6. The method of claim 1, wherein obtaining the first policy comprises:

receiving, from the control plane entity, the first policy that is retrieved based on one or more of the following identification information associated with the first client: media access control (MAC) address, Internet Protocol (IP) address, an inner identifier, an outer identifier, and a chargeable-user identifier (CUID).

7. The method of claim 3, wherein the method further comprises at least one of the following:

in response to the proxy agent detecting a change of authorization (CoA) message from the external AAA server, generating and sending a first report to the control plane entity to cause the control plane entity to send a first instruction to modify session information associated with the first client; and in response to the proxy agent detecting a packet of disconnect (POD) message from the external AAA server, generating and sending a second report to the control plane entity to cause the control plane entity to send a second instruction to terminate an N3 session between the data plane entity and an N3 gateway.

8. A non-transitory computer-readable storage medium that includes a set of instructions which, in response to execution by a processor of a computer system that includes an interworking function on a data plane and a data plane entity associated with a second type of network traffic, cause the processor to perform a method of policy-aware traffic forwarding for multiple types of network traffic that include a first type of network traffic and the second type of network traffic, wherein the method comprises:

extracting, by the interworking function, identification information of a first client, wherein the first client is associated with the first type of network traffic, and the interworking function resides between the data plane entity and an access network connected to the first client;

based on the identification information, obtaining, by the interworking function, a first policy associated with the first client from a control plane entity associated with the second type of network traffic;

in response to detecting first network traffic of the first type from the first client, (a) interworking, by the interworking function, the first network traffic into the data plane entity, and (b) forwarding the first network traffic via the data plane entity according to the first policy associated with the first client; and in response to detecting second network traffic of the second type from a second client, forwarding the second network traffic via the data plane entity according to a second policy associated with the second client.

9. The non-transitory computer-readable storage medium of claim 8, wherein obtaining the first policy comprises:

obtaining the first policy from a session management function (SMF) entity residing on the control plane associated with the second type of network traffic.

10. The non-transitory computer-readable storage medium of claim 8, wherein extracting the identification information comprises:

extracting, using a proxy agent supported by the computer system, the identification information during an authentication process, wherein the identification information is extracted from one or more messages destined for or originating from an external authentication, authorization and accounting (AAA) server configured to authenticate the first client using credential information associated with the first client.

11. The non-transitory computer-readable storage medium of claim 8, wherein extracting the identification information comprises:

extracting the identification information from a request message for an Internet Protocol (IP) address assignment using dynamic host configuration protocol (DHCP), or a response message in reply to the request message.

12. The non-transitory computer-readable storage medium of claim 11, wherein obtaining the first policy comprises:

generating and sending, by the computer system to the control plane entity, a packet data unit (PDU) session establishment request that includes the identification information; and receiving, by the computer system from the control plane entity, one or more N4 session establishment requests specifying one or more parameters of the first policy.

13. The non-transitory computer-readable storage medium of claim 8, wherein obtaining the first policy comprises:

receiving, from the control plane entity, the first policy that is retrieved based on one or more of the following identification information associated with the first client: media access control (MAC) address, Internet Protocol (IP) address, an inner identifier, an outer identifier, and a chargeable-user identifier (CUID).

14. The non-transitory computer-readable storage medium of claim 10, wherein the method further comprises at least one of the following:

in response to the proxy agent detecting a change of authorization (CoA) message from the external AAA server, generating and sending a first report to the control plane entity to cause the control plane entity to send a first instruction to modify session information associated with the first client; and in response to the proxy agent detecting a packet of disconnect (PoD) message from the external AAA server, generating and sending a second report to the control plane entity to cause the control plane entity to send a second instruction to terminate an N3 session between the data plane entity and an N3 gateway.

15. A computer system configured to act as a universal gateway for policy-aware traffic forwarding for multiple types of network traffic that include a first type of network traffic and a second type of network traffic, comprising:

(a) an interworking function on a data plane; and (b) a data plane entity associated with the second type of network traffic, wherein:

the interworking function, residing between the data plane entity and an access network connected to a first client, is to extract identification information of the first client, wherein the first client is associated with the first type of network traffic;

based on the identification information, the interworking function is to obtain a first policy associated with the first client from a control plane entity associated with the second type of network traffic;

in response to detecting first network traffic of the first type from the first client, (a) the interworking function is to interwork the first network traffic into the data plane entity, and (b) the data plane entity is to forward the first network traffic according to the first policy associated with the first client; and in response to detecting second network traffic of the second type from a second client, the data plane entity is to forward the second network traffic according to a second policy associated with the second client.

16. The computer system of claim 15, wherein the interworking function is to obtain the first policy by performing the following:

obtaining the first policy from a session management function (SMF) entity residing on the control plane associated with the second type of network traffic.

17. The computer system of claim 15, wherein the interworking function further comprises a proxy agent, and the interworking function is to extract the identification information by performing the following:

extracting, using the proxy agent, the identification information during an authentication process, wherein the identification information is extracted from one or more messages destined for or originating from an external authentication, authorization and accounting (AAA) server configured to authenticate the first client using credential information associated with the first client.

18. The computer system of claim 15, wherein the interworking function further comprises a dynamic host configuration protocol (DHCP) server, and the interworking function is to extract the identification information by performing the following:

extracting the identification information from a request message for an Internet Protocol (IP) address assignment received by the DHCP server, or a response message in reply to the request message.

19. The computer system of claim 18, wherein the interworking function is to obtain the first policy by performing the following:

generating and sending, by the computer system to the control plane entity, a packet data unit (PDU) session establishment request that includes the identification information; and receiving, by the computer system from the control plane entity, one or more N4 session establishment requests specifying one or more parameters of the first policy.

20. The computer system of claim 15, wherein the interworking function is to obtain the first policy by performing the followingf:

receiving, from the control plane entity, the first policy that is retrieved based on one or more of the following identification information associated with the first client: media access control (MAC) address, Internet Protocol (IP) address, an inner identifier, an outer identifier, and a chargeable-user identifier (CUID).

21. The computer system of claim 17, wherein the proxy agent is configured to:

in response to the proxy agent detecting a change of authorization (CoA) message from the external AAA server, generate and send a first report to the control plane entity to cause the control plane entity to send a first instruction to modify session information associated with the first client; and in response to the proxy agent detecting a packet of disconnect (PoD) message from the external AAA server, generate and send a second report to the control plane entity to cause the control plane entity to send a second instruction to terminate an N3 session between the data plane entity and an N3 gateway.

* * * * *